United States Patent Office 3,149,182
Patented Sept. 15, 1964

3,149,182
PROCESS FOR PREPARING BLOCK COPOLYMERS UTILIZING ORGANOLITHIUM CATALYSTS
Lee M. Porter, Concord, Calif., assignor to Shell Oil Company, a corporation of Delaware
No Drawing. Filed Oct. 28, 1957, Ser. No. 692,556
5 Claims. (Cl. 260—879)

This invention relates to a process for preparing copolymers. More particularly, the invention relates to a new process for preparing block copolymers using a special organo metallic catalyst and to the new copolymers prepared thereby.

Specifically, the invention provides a practical and economical method for preparing block copolymers, i.e. copolymers having a segment of one polymer joined through a primary chemical bond to a segment of a dissimilar polymer. This process of the invention comprises contacting a monomer of the group consisting of polyethylenically unsaturated hydrocarbons, alkenyl-substituted aromatic hydrocarbons and alkenyl-substituted heterocyclic compounds with an organolithium compound, and preferably a hydrocarbon lithium compound, such as, for example, butyl lithium, in an inert atmosphere and under substantially anhydrous conditions until there is no unpolymerized monomer in the reaction mixture and then adding a dissimilar monomer of the above group and continuing the reaction under the above conditions until the desired amount of the second monomer has been polymerized.

Attempts have been made in the past to improve the properties of many of the homopolymers of the unsaturated monomers by copolymerizing the said monomers with various dissimilar monomers, the homopolymers of which display the desired superior properties. These copolymers have been prepared heretofore by merely mixing the unsaturated compound with the desired dissimilar monomer and then subjecting the resulting mixture to polymerization conditions, such as heat, light and catalyst. When combined under these conditions, the two monomers usually add to the polymer chain in a more or less random fashion and the resulting polymer chains are made up of a very complicated arrangement of the two kinds of monomers. Copolymers prepared from monomers A and B, for example, will have the A and B units arranged in some such order as

ABBAABBBABBAABABBA

This method of producing the desired copolymers is not entirely satisfactory. It has been found, for example, that when the monomer units are distributing throughout the polymer chains in the above-described manner, they fail to impart the properties of their corresponding homopolymers and the resulting copolymers in many cases possess an entirely different set of properties. Furthermore, as there is no definite control over the order in which the monomers add to the polymer chain, the copolymers produced by this process rarely, if ever, have the same molecular structure and the standardization of the copolymers and their application is quite difficult.

Some of these difficulties can be overcome by producing block copolymers, i.e. polymers made up of a segment of one polymer joined in an end to end arrangement through a primary chemical bond with a segment of a second polymer. Methods for producing such polymers, however, have been difficult to devise. Free radical type reactions can seldom be used for this purpose as the initial polymer segment is usually terminated before the second dissimilar monomer can be added. Furthermore, there is still no control over the size of the initial segment of polymer and the resulting block copolymers do not have uniform composition or uniform molecular weight.

It is an object of the invention therefore to provide a new process for preparing copolymers. It is a further object to provide a process for preparing block copolymers using a special organo metallic catalyst. It is a further object to provide a new process for preparing block copolymers which have substantially uniform molecular weight and uniform composition. It is a further object to provide a process for preparing block copolymers having many unusual and beneficial properties. It is a further object to provide a process for preparing block copolymers from polyethylenically unsaturated monomers which have valuable elastomeric properties. Other objects and advantages of the invention will be apparent from the following detailed description thereof.

It has now been discovered that these and other objects may be accomplished by the process of the invention which comprises contacting a monomer of the group consisting of polyethylenically unsaturated hydrocarbons, alkenyl-substituted aromatic hydrocarbons and alkenyl-substituted heterocyclic compounds with an organolithium compound, such as, for example, butyl lithium, in an inert atmosphere and under substantially anhydrous conditions until there is no unpolymerized monomer in the reaction mixture and then adding a dissimilar monomer of the above-described group and continuing the reaction under the above-noted conditions until the desired amount of the second monomer has been polymerized. It has been found that by the use of this process one can produce true block copolymers in a very efficient manner. In addition, the products have substantially uniform composition as well as substantially uniform molecular weights and reproduction and standardization of product is relatively simple. Further, the products prepared by this method have been found to have unusual properties not expected from products of this type and can readily be adapted for many commercial application. The products prepared from the polyethylenically unsaturated compounds, for example, have unusual elastomeric properties and can be used to prepare rubbery products having good strength and impact resistance.

The monomers to be used in the process of the invention comprise the ethylenically unsaturated monomers of the group consisting of polyethylenically unsaturated hydrocarbons, alkenyl-substituted aromatic hydrocarbons and alkenyl-substituted heterocyclic compounds. Examples of these monomers include, among others, butadiene, isoprene, 2,3-dimethylbutadiene, 2-butyl-1,3-butadiene, cyclohexadiene, styrene, p-methoxystyrene, p-butylstyrene, p-octylstyrene, 2-vinylpyridine, 2-methyl-5-vinylpyridine and the like, and mixtures thereof.

The preferred monomers to be employed are the alkadienes containing from 4 to 10 carbon atoms, the alkenyl-substituted aromatic hydrocarbons containing not more than 12 carbon atoms and the alkenyl-substituted pyridine compounds containing not more than 12 carbon atoms.

The monomers used in the process of the invention should have a high degree of purity, e.g. they should have at least 90% purity and preferably more than 97% purity.

In order of operation, it is preferred to use the polyethylenically unsaturated hydrocarbons in preparing the initial segment and then adding one of the other monomers. It is possible, however, to first start with one of the other monomers and then add the polyethylenically unsaturated monomer.

According to the process of the invention, one first polymerizes the initial monomer or monomers in the presence of the organolithium compound under inert atmosphere and substantially anhydrous conditions, and when there is substantially no initial monomer or monomers remaining in the reaction mixture, adding the dissimilar monomer or monomers as noted above and continuing the polymerization until the required amount of the dissimilar monomer has been polymerized. A proton donor may then be added to deactivate the catalyst.

The organolithium compound used in the reaction may be any organo-substituted lithium derivative, and preferably a hydrocarbon lithium compound, such as, for example, alkyl, alkaryl, aryl or arylalkyl lithium compounds, such as, ethyl lithium, butyl lithium, n-dodecyl lithium, octadecyl lithium, allyl lithium, phenyl lithium, octyl lithium and the like.

Compounds containing two or more lithium compounds may also be used, such as, for example, methylene dilithium, ethylene dilithium, pentamethylene dilithium, decamethylene dilithium, 1,4-dilithium benzene, dilithium naphthalene, 1,2,6-trilithium hexane, and the like.

Preferred catalysts comprise the alkyl and aryl lithium compounds containing from 3 to 30 carbon atoms and still more preferably from 3 to 15 carbon atoms.

The organolithium catalysts are prepared by conventional methods, such as by the addition of lithium metal dispersion to a hydrocarbyl chloride in a suitable solvent. This is exemplified by the following procedure showing the preparation of n-butyl lithium.

N-BUTYL LITHIUM CATALYST 2.2 moles of lithium metal dispersion was combined with 100 ml. of benzene in a reaction flask equipped with stirrer and reflux condenser. The flask was purged with nitrogen and the mixture stirred. 1 mole of n-butyl chloride was then added dropwise and the mixture kept at a temperature of 80° C. or less for several hours. The resulting product was a colorless liquid, easily separable from the purple solid by products. It was placed under nitrogen until used as a catalyst as shown in the examples below.

Dodecyl lithium catalyst is prepared in the same manner by replacing the butyl chloride with 1-chlorododecane. Phenyl lithium may be prepared in the above manner by replacing the butyl chloride with bromobenzene. Pentamethylene dilithium is prepared by replacing the butyl chloride in the above process with pentamethylene dichloride.

The amount of the initial monomer and the amount of the organolithium compound to be used in the reaction will vary depending chiefly on the molecular weight desired for the initial polymer segment. Assuming that each of the organolithium molecules gives rise to a polymer macromolecule, and that the macromolecules under the conditions of the process can be initiated in no other way, then by controlling the amount of the monomer and the catalyst we can control the molecular weight. On this basis, we can keep the amount of the monomer constant and get different molecular weights by changing the amount of the catalyst, or we can hold the amount of catalyst constant and get different molecular weights by varying the amount of the monomer. For example, theoretically, to obtain a molecular weight of say 100,000 using .0027 mol of organo lithium catalyst one would need approximately 4 mols of isoprene.

The process of the invention can be used to produce initial polymer segments of any desired molecular weight. Preferred molecular weights range from about 2,000 to 500,000. These values as are determined by the light scattering technique are disclosed in Chem. Rev., vol. 40, page 319 (1949).

As noted above, the process of the invention must be conducted in an inert atmosphere. This is preferably accomplished by sweeping out the reaction zone with an inert gas and maintaining an atmosphere of the inert gas during the course of the reaction. Suitable inert materials include nitrogen, methane, and the like.

The process should also be conducted under substantially anhydrous conditions. This is accomplished by using anhydrous reactants and dry reaction vessels and maintaining customary precautions during the reaction to keep water out of the reaction vessel.

The reaction may be accomplished in the presence or absence of solvent or diluent. If solvents or diluents are employed, they should be inert materials, such as liquid hydrocarbons as benzene, toluene, xylene and the like. Solvents with organic functional groups not containing "active" hydrogen are sometimes particularly advantageous, such as, for example, the ethers as tetrahydrofuran.

The temperature used in polymerization of the initial monomer may vary over a wide range. In general, temperatures in bulk or in hydrocarbon solution range from about 15° C. to about 100° C. If the initial monomer is a polyolefin, such as isoprene, the reaction takes place readily at room temperature and no additional heat is needed to obtain the desired reaction rate. In the case of the other monomers, a satisfactory reaction rate is generally obtained by using temperatures ranging from about 40° C. to 90° C. Other solvents such as tetrahydrofuran allow satisfactory rates at 0° C. with most monomers and have been used at temperatures as low as −40° C.

Polymerization of the initial monomer is continued under the above conditions until there is substantially no unpolymerized monomer present in the reaction mixture. This may be accomplished by continuing the polymerization until it appears that substantially all of the monomer has been polymerized, or alternatively by interrupting the polymerization at any stage in the process and removing substantially all of the unpolymerized monomer from the reaction mixture by conventional means. A polymerization of 100% of the monomer, or a complete removal of all of the unpolymerized monomer is usually difficult to obtain as in many cases some of the monomer will be retained within the polymer chain, etc. Therefore, the expression "substantially all" as used throughout the specification and claims in regard to the polymerization of the initial monomer, or the removal of the unpolymerized initial monomer from the reaction mixture is meant such a complete removal or polymerization as can generally be accomplished, e.g. a polymerization of at least 94% of the initial monomer, or a removal of about 6% or less of the unpolymerized monomer.

After the reaction mixture containing the polymer of the initial monomer has been substantially freed of the initial monomer, a dissimilar monomer is then added to the reaction mixture. A single monomer may be added or a mixture of two or more of the monomers may be used. If a mixture of monomers were used in the initial phase, the mixture added to form the second segment may be made up of the same or different monomers in the same or different ratios. The monomer or monomers selected are preferably deoxygenated before being added to the medium containing the polymer of the initial monomer.

The amount of the dissimilar monomer added will depend upon the ratio in which the said initial and second monomer are desired in the finished product. Thus, for example, if the desired product is a copolymer of 25% polyisoprene and 75% polystyrene, the amount of the styrene added to the active polystyrene will be about three times the amount of the said polymer.

After the second dissimilar monomer has been added to the reaction mixture, the polymerization is continued in an inert atmosphere under the anhydrous conditions shown above and at the temperatures shown above.

If one desires a new copolymer having yet a third, fourth or fifth polymer segment, one can continue to add dissimilar monomers to the mixture containing the active polymer and continue the polymerization under the above-described conditions.

At the completion of the reaction, a proton donor is then added to remove the lithium from the polymer. Materials that are useful for this purpose include oxygen-containing materials as alcohols, esters, and the like.

After removal of the lithium, the solvent and other components may be stripped from the mixture yielding the desired block copolymer.

The copolymers produced by the process of the invention will have properties closely related to those of the homopolymers contained in the said copolymers. As the properties may be conveniently predicted in most cases by a proper selection of monomers and amounts, copolymers can be produced which can be used for a wide variety of industrial applications. As indicated above, copolymers prepared from the diolefins possess unusual properties as rubbers and elastomers and can be utilized as such in the preparation of molded articles. Copolymers prepared by the process of the invention also find use in the preparation of coating compositions and impregnating compositions and as additives for various lubricating compositions.

To illustrate the manner in which the invention may be carried out, the following examples are given. It is to be understood, however, that the examples are for the purpose of illustration, and the invention is not to be regarded as limited to any of the specific conditions cited therein.

The isoprene used in the examples was purified by distilling off potassium-sodium alloy and keeping under nitrogen at −20° C. The styrene was purified by passing through 28 to 200 mesh silica gel, keeping under nitrogen at −20° C.

In all of the polymerization reactions reported below, the reactor was prepared by flaming the reactor with an open flame at 150–200° C., passing nitrogen through the reactor and cooling down with nitrogen still being passed through. The monomer was added through a serum cap with hypodermic needles.

*Example I*

This example illustrates the preparation of a block copolymer having a segment of polyisoprene joined by a primary chemical bond to a segment of polystyrene.

45 parts of purified isoprene was placed in 1200 parts benzene. 5.3 parts of 1.8 normal solution of butyl lithium in benzene was added to this mixture. This mixture was kept under nitrogen without application of external heat for approximately 5 hours. Analysis of a sample of the mixture indicated substantially all of the isoprene had been consumed. 255 parts of deoxygenated styrene was then added to the mixture through a serum cap. The combined mixture was maintained under nitrogen for the next 5 hours until all of the styrene had been polymerized. Methyl alcohol was then added to remove the lithium. The resulting product was a hard rubber solid which contained approximately 15% isoprene and 85% styrene chemically bound in the polymer. The polymer had the following properties: intrinsic viscosity 0.86, impact (Izod) 0.26, heat distortion point 73.5° C. and Rockwell M hardness −98.

The above product could be injection molded to form any desired plastic article.

Related results are obtained by repeating the above process with the exception that the styrene is replaced by the following monomers: vinylpyridine, butadiene and methylpentadiene.

*Example II*

This example illustrates the preparation of a block copolymer having a segment of polybutadiene joined to a segment of polystyrene.

30 parts of purified butadiene is placed in 1200 parts of benzene. 5.3 parts of a 1.8 Normal solution of butyl lithium in benzene is added to this mixture. This mixture is kept under nitrogen without application of external heat for approximately 5 hours. Analysis of a sample of the mixture indicated substantially all of the butadiene has been consumed. 270 parts of deoxygenated styrene is then added to the mixture through a serum cap. The combined mixture is maintained under nitrogen for the next 5 hours until all of the styrene has been polymerized. Methyl alcohol is then added to remove the lithium. The resulting product is a hard rubbery solid which contains approximately 10% butadiene and 90% styrene chemically bound in the polymer.

The above product can be injection molded to form any desired plastic article.

Related results are also obtained by repeating the above process with the exception that the butyl lithium is replaced by the following catalysts: phenyl lithium, dodecyl lithium, isopropyl lithium and cyclohexyl lithium.

*Example III*

This example illustrates the preparation of the block copolymer starting with styrene as the initial monomer and butyl lithium as the catalyst with isoprene added as the dissimilar monomer.

255 parts of purified styrene are combined with 1200 parts of benzene. 5.3 parts of a 1.8 Normal solution of butyl lithium in benzene is added to this mixture. This mixture is kept under nitrogen without application of external heat for approximately 5 hours. Analysis of a sample indicated that approximately all of the styrene had been consumed. 45 parts of deoxygenated isoprene is then added to the mixture. The combined mixture is maintained under nitrogen for the next 5 hours until all of the isoprene has been polymerized. Methyl alcohol is then added to remove the lithium. The product is a hard rubbery solid containing about 85% styrene and 15% isoprene having properties related to those of the copolymer prepared in Example I.

*Example IV*

This example illustrates the preparation of a block copolymer made up of a segment of polyisoprene using amyl lithium as the catalyst and tetrahydrofuran as a solvent.

3 parts of purified styrene was combined with 15 parts of tetrahydrofuran and .05 part of .7 N amyl lithium in benzene was added to the mixture. This mixture was kept under nitrogen at −0° C. until the styrene had polymerized. 2 parts of purified isoprene was then added and the mixture kept under nitrogen for about 1 hour until all of the isoprene had been polymerized. The resulting product is a solid made up of 60% styrene and 40% isoprene.

*Example V*

This example illustrates the preparation of a three component block copolymer made up of a segment of polybutadiene joined to a segment of polystyrene which is in turn joined to a segment of polybutadiene.

1 part of purified butadiene was combined with 5 parts tetrahydrofuran and .2 part of .7 N amyl lithium in benzene added to the mixture. This mixture was kept under nitrogen at 0° C. for about 1 hour. At that time the butadiene had been polymerized. 1 part of purified styrene was then added and the mixture kept under nitrogen at about 0° C. When the styrene had all been polymerized, 1 part of purified butadiene was again added to the mixture under nitrogen. The resulting product was a tough hard surfaced solid. The solid contained 78% styrene and the remainder butadiene. The butadiene content was made up of 88% 1,2 and 12% trans-1,4- structure.

The above solid could be injection molded to form various plastic articles.

*Example VI*

This example illustrates the preparation of another three component copolymer wherein a segment of polystyrene is joined to a segment of polybutadiene which in turn is joined to a segment of polystyrene.

1.7 parts of purified styrene was combined with 5 parts of tetrahydrofuran and .2 part of .7 N amyl lithium was added to the mixture. This mixture was kept nitrogen at between 0° C. and room temperature until the styrene had been polymerized. 1 part of purified butadiene was then added and the mixture kept under nitrogen within the above-noted temperature range. When the butadiene had been polymerized, 1.7 parts of purified polystyrene was again added and the mixture kept at 0° C. until the monomer had been polymerized. The resulting product was a soft brittle solid containing 82% styrene and the remainder butadiene. The butadiene was made up of 89% 1,2 and 11% trans-1,4 structure.

*Example VII*

A faster reaction and new type of product is obtained by repeating Example I using pentamethylene dilithium in place of the butyl lithium. In this case the resulting product is a hard solid made up of internal segment of polyisoprene joined at each end to separate segments of polystyrene. Similar results are obtained with hexamethylene dilithium, 1,4-dilithium benzene and 1,5-dilithium naphthalene.

I claim as my invention:

1. A process for preparing an elastomeric three component block copolymer which comprises contacting a monomer of the group consisting of diolefins containing from 4 to 10 carbon atoms, mono alkenyl-substituted aromatic hydrocarbons and mono-alkenyl-substituted pyridine compounds with a hydrocarbon lithium compound in an inert atmosphere and under substantially anhydrous conditions until there is no unpolymerized monomer in the reaction mixture, adding to this same reaction mixture which has not been further treated a monomer of the above group which is dissimilar to that used in the initial reaction and continuing the polymerization under the above conditions until the dissimilar monomer has been polymerized, and then adding to this same reaction mixture which has not been further treated a third monomer which is different from the aforementioned dissimilar monomer and selected from the above group of monomers, and continuing the polymerization under the aforedescribed conditions until the third monomer has been polymerized, at least one of the monomers utilized being a diolefin.

2. A process as in claim 1 wherein the initial monomer is styrene, the second monomer is butadiene and the third monomer is styrene.

3. A process as in claim 1 wherein the initial monomer is butadiene, the second monomer is styrene and the third monomer is butadiene.

4. A process according to claim 1 wherein the initial monomer is a monoalkenyl-substituted aromatic hydrocarbon, the second monomer is a diolefin and the third monomer is a mono-alkenyl substituted aromatic hydrocarbon.

5. A process according to claim 1 wherein the initial monomer is a diolefin, the second monomer is a monoalkenyl substituted aromatic hydrocarbon and the third monomer is a diolefin.

References Cited in the file of this patent

UNITED STATES PATENTS

| | | |
|---|---|---|
| 2,338,741 | Soday | Jan. 11, 1944 |
| 2,377,779 | Hanford et al. | June 5, 1945 |
| 2,608,555 | Bullitt | Aug. 26, 1952 |
| 2,694,692 | Amos et al. | Nov. 16, 1954 |
| 2,797,208 | Burke | June 25, 1957 |
| 3,031,432 | Kern | Apr. 24, 1962 |

FOREIGN PATENTS

| | | |
|---|---|---|
| 339,243 | Great Britain | Dec. 1, 1930 |
| 499,577 | Canada | Jan. 26, 1954 |
| 201,396 | Australia | Apr. 4, 1956 |

OTHER REFERENCES

Immergut et al.: Die Makromolekulare Chemie, 18/19, pp. 322–341, especially page 327 (1956).

Bawn: "The Chemistry of High Polymers," New York, Interscience Publishers Inc. (1948), p. 20.